No. 743,908. PATENTED NOV. 10, 1903.
O. MINTON.
VEHICLE BRAKE MECHANISM.
APPLICATION FILED APR. 27, 1903.

NO MODEL.

WITNESSES:
Joshua Bingham
C. R. Ferguson

INVENTOR
Ogden Minton
BY
ATTORNEYS.

No. 743,908.

Patented November 10, 1903.

UNITED STATES PATENT OFFICE.

OGDEN MINTON, OF NEW YORK, N. Y.

VEHICLE-BRAKE MECHANISM.

SPECIFICATION forming part of Letters Patent No. 743,908, dated November 10, 1903.

Application filed April 27, 1903. Serial No. 154,523. (No model.)

*To all whom it may concern:*

Be it known that I, OGDEN MINTON, a citizen of the United States, and a resident of the city of New York, borough of Brooklyn, in the county of Kings and State of New York, have invented a new and Improved Vehicle-Brake Mechanism, of which the following is a full, clear, and exact description.

This invention relates particularly to improvements in brake mechanism for automobiles or motor-vehicles, an object being to provide a simple means to insure the cutting off of the steam or other motive agent upon applying the brake.
I will describe a vehicle-brake mechanism embodying my invention, and then point out the novel features in the appended claims.

Reference is to be had to the accompanying drawings, forming a part of this specification, in which similar characters of reference indicate corresponding parts in all the figures.

Figure 1:
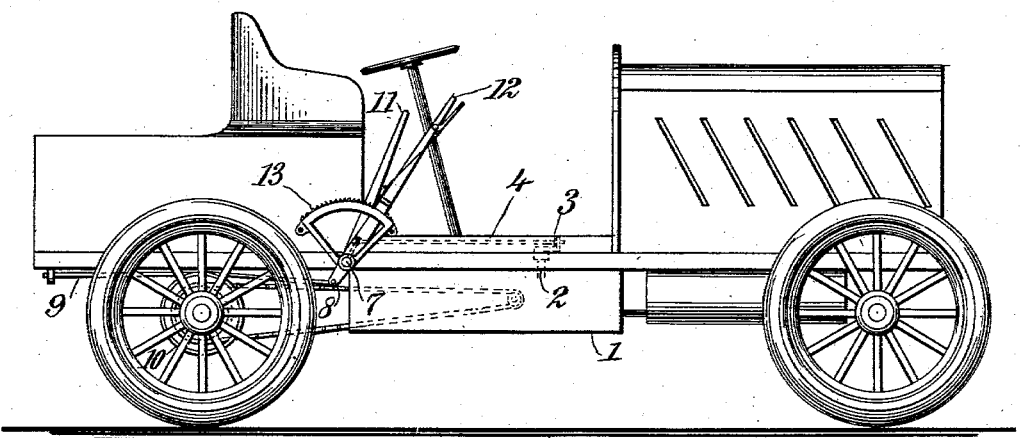
Figure 2:
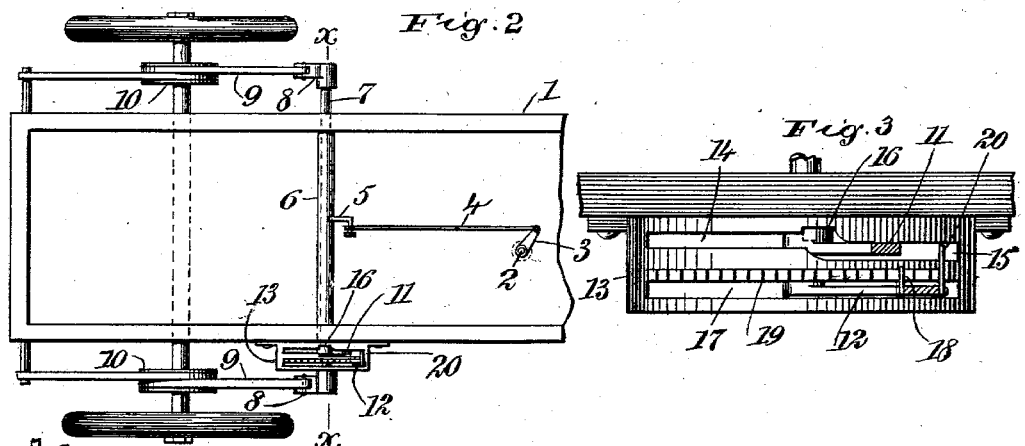
Figure 4:
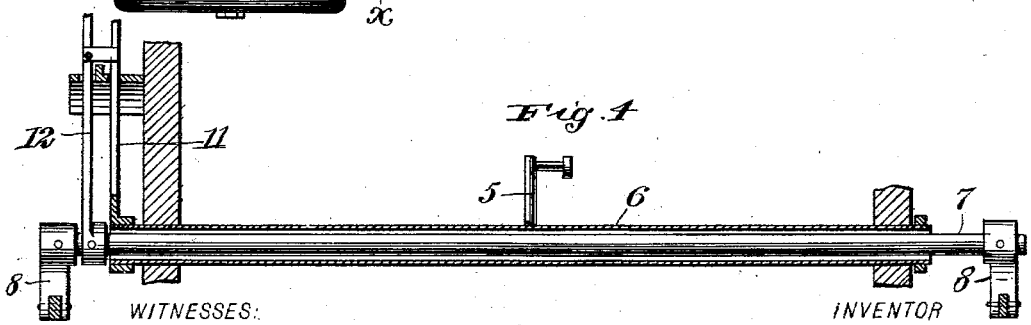

Figure 1 is a side elevation of a motor-vehicle with a brake mechanism embodying my invention applied thereto. Fig. 2 is a plan view thereof. Fig. 3 is a sectional detail showing the brake and throttle levers, and Fig. 4 is a section on the line *x x* of Fig. 2.

Referring to the drawings, 1 designates a motor-vehicle driven by any suitable motive agent—such, for instance, as steam—and this steam is controlled in its passage from the boiler to the engine by means of a valve having a stem 2 from the crank 3, of which a rod 4 extends to a connection with an arm 5, carried by a tubular shaft 6, having bearings in the side rails of the vehicle. Extended through the shaft 6 is a brake-operating shaft 7, having arms 8 at its ends, and to these arms the forward ends of the brake-straps 9 are connected, the rear ends being connected to a fixed part extended from the body of the vehicle, and these brake-straps coact frictionally with disks 10 on the axle.
Attached to the end of the tubular shaft 6 is a lever 11, and attached to the same end of the shaft 7 is a brake-operating lever 12. The lever 11 extends through a slot formed in a segment-plate 13. The slot into which the lever 11 passes consists of two portions 14 15, one being slightly outside of the plane of the other—that is, laterally thereof—and at the junction of the two sections 14 15 of the slot is a notch 16 for receiving the lever 11, as will be hereinafter described. The lever 12 passes through a slot 17 in the plate 13 and carries a pawl 18 for engaging with any one of the teeth of the segment-rack 19. Also carried by the lever 12 is a finger 20, designed to engage with the lever 11.

In the operation when it is desired to stop the vehicle a back pull on the lever 12 will cause the finger 20 to engage with the lever 11, so that said lever 11 will be moved along with the brake-operating lever until said lever 11, which is of resilient material, springs into the notch 16, thus moving it out of the line of movement of the finger 20, so that the brake-lever may continue its rearward motion, if necessary. When the lever 11 is in its vertical or central position—that is, sprung into the notch 16—the valve controlling the motive-agent supply will be closed. When it is desired to reverse the vehicle, the lever 11 may be moved backward to open the controlling-valve.

It is obvious that with my invention it will be practically impossible to operate the brake mechanism without also cutting off the motive agent, therefore avoiding possible accidents.

Having thus described my invention, I claim as new and desire to secure by Letters Patent—

1. In a motor-vehicle, a brake mechanism, an operating-lever therefor, a valve-controlling lever, a segment-plate having a slot through which said valve-controlling lever passes, the said slot having a notch in one of its walls into which the said controlling-lever may swing, and a finger carried by the brake-operating lever for engaging with the valve-controlling lever.

2. In a motor-vehicle, a tubular shaft, a valve mechanism, a connection between said tubular shaft and the valve mechanism, a laterally-swinging operating-lever carried by the tubular shaft, a shaft extended through the tubular shaft, a brake mechanism having connection with said shaft, a finger carried by the brake-lever for causing the movement of the first-named lever until released from said finger by the lateral swinging.

3. In a motor-vehicle, a tubular shaft, a controlling-valve for the motive agent, a connection between said shaft and said valve, a spring yielding lever mounted on said tubular shaft, a segment-plate having a slot through which said lever passes, the said slot being arranged in two planes laterally one of the other, a notch at the junction of the two planes, a shaft extended through the tubular shaft and having connection with brake devices, a lever carried by the shaft, and a finger on said lever for engaging with the first-named lever.

4. In a motor-vehicle, a valve-controlling lever, a brake-controlling lever, and means for causing a movement of the valve-lever with the brake-lever, the said valve-lever being resilient whereby it may be moved out of engagement with the brake-lever permitting the said brake-lever to continue in its movements.

In testimony whereof I have signed my name to this specification in the presence of two subscribing witnesses.

OGDEN MINTON.

Witnesses:
FRANCIS L. MINTON,
GEORGE W. PLEISSNER.